A. KNISTROM.
CALCULATING MACHINE.
APPLICATION FILED DEC. 17, 1910.
1,072,740.
Patented Sept. 9, 1913.
5 SHEETS—SHEET 3.
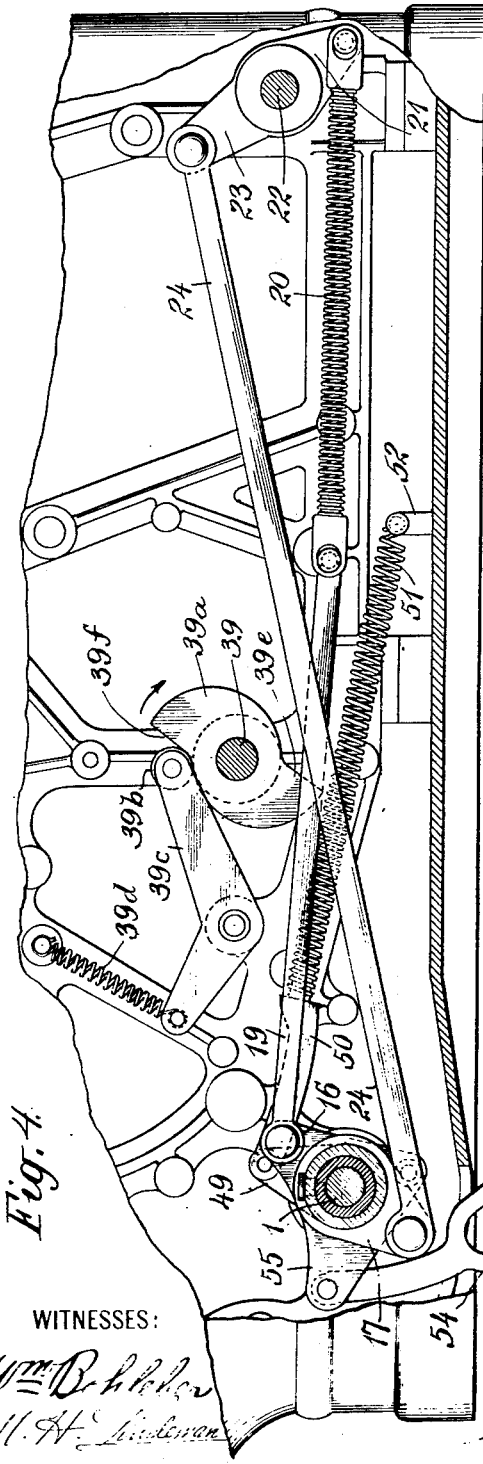
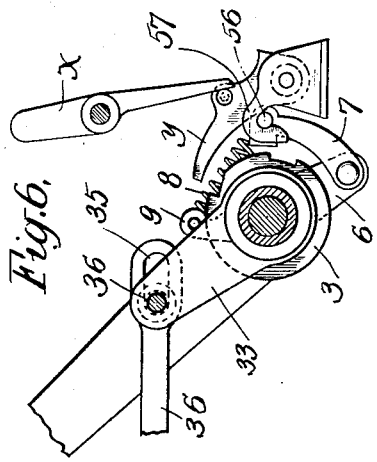
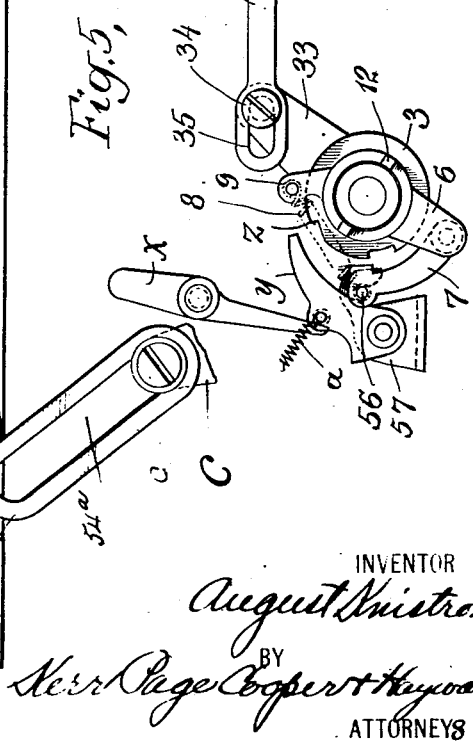
WITNESSES:
INVENTOR
August Knistrom
BY
Kerr Page Cooper & Hayward
ATTORNEYS A. KNISTROM.
CALCULATING MACHINE.
APPLICATION FILED DEC. 17, 1910.
1,072,740.
Patented Sept. 9, 1913.
5 SHEETS—SHEET 4.
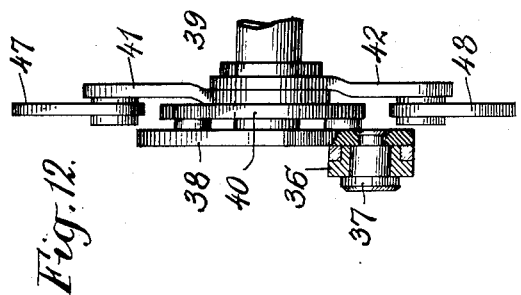
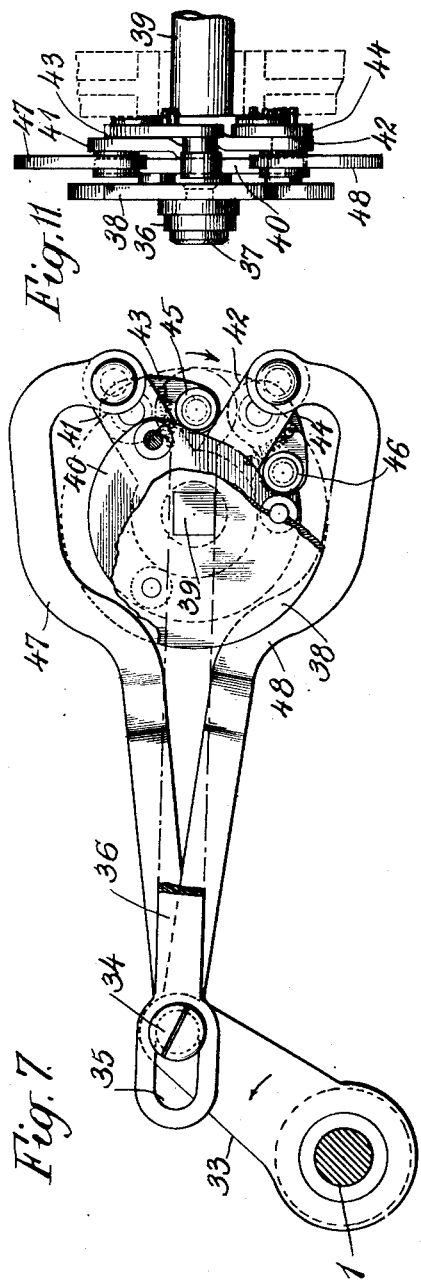
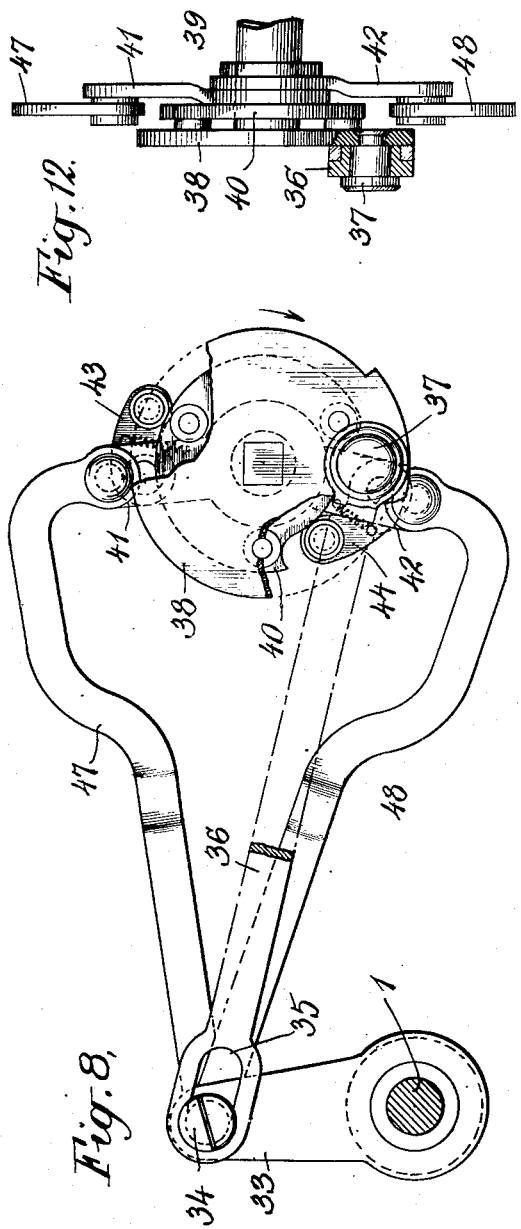
WITNESSES:
INVENTOR
August Knistrom
BY
Kerr Page Cooper Hayward
ATTORNEYS

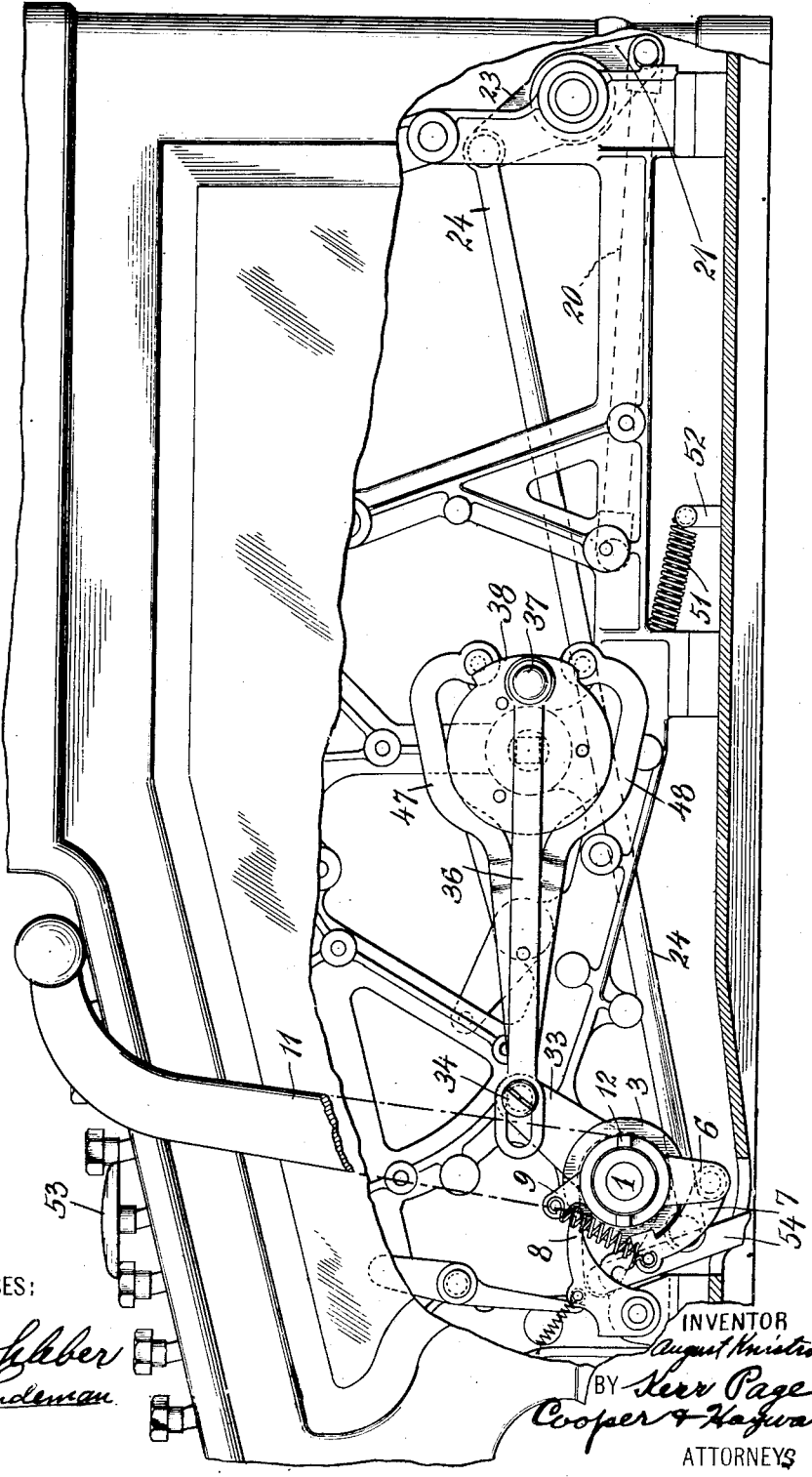

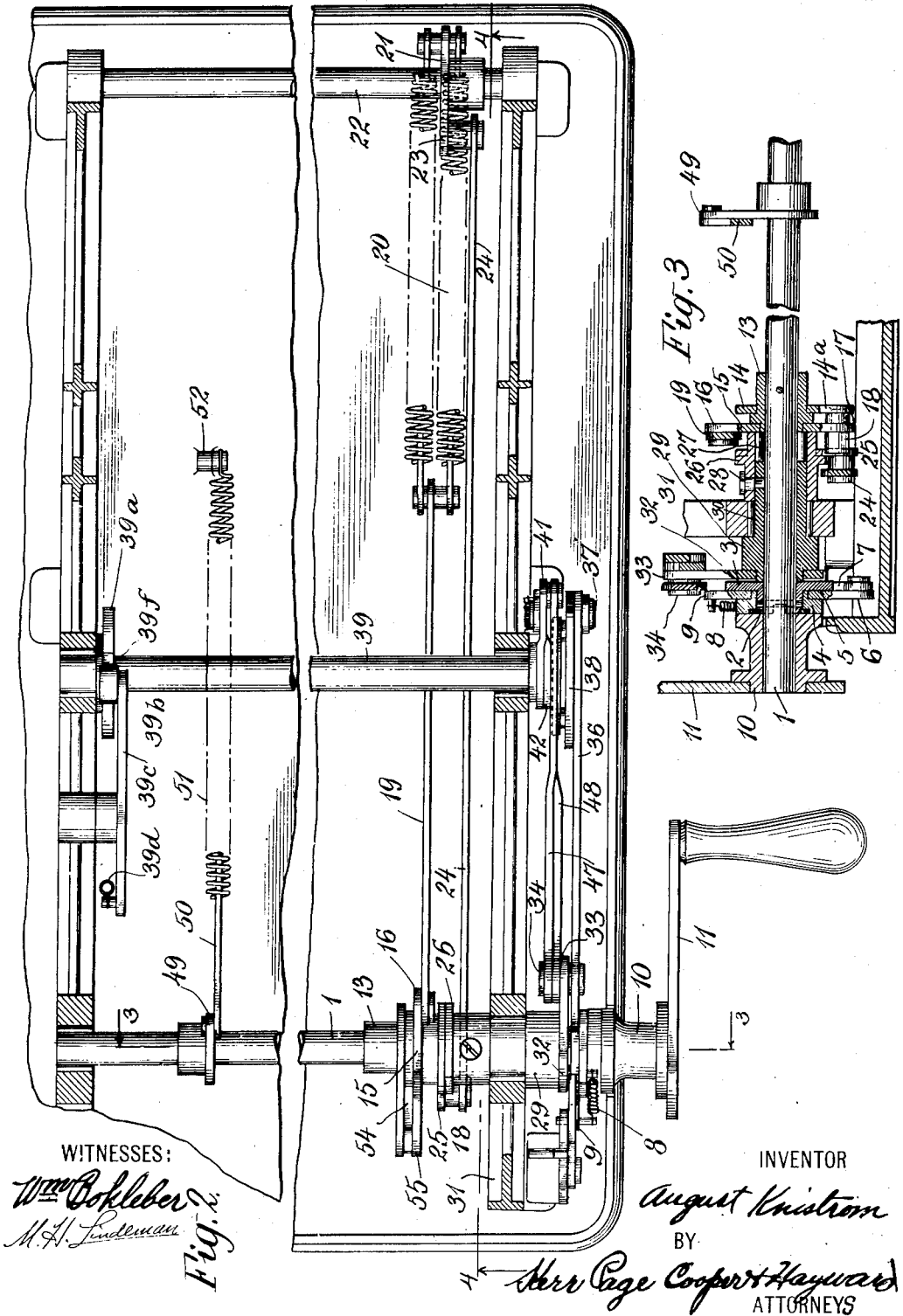

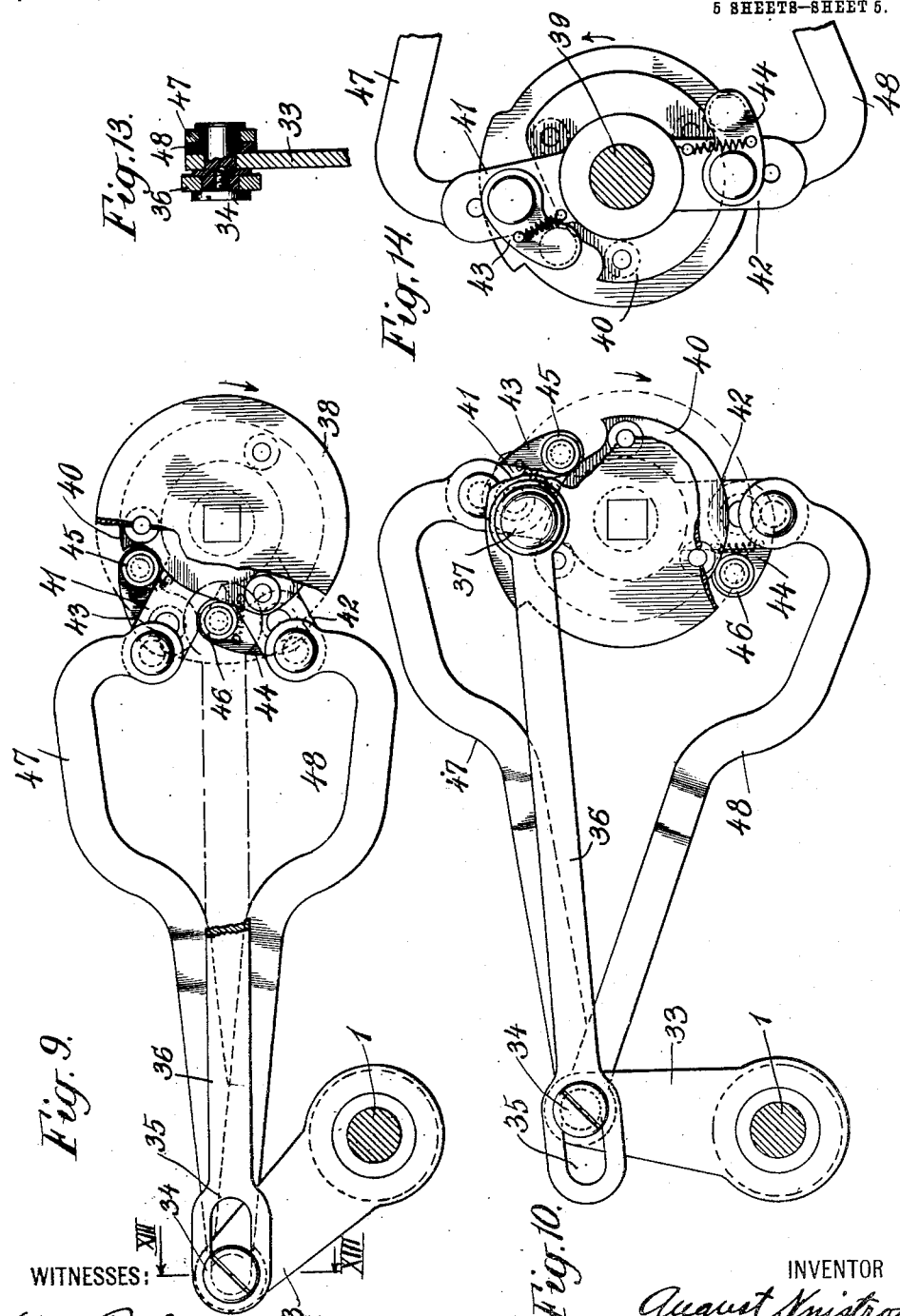

UNITED STATES PATENT OFFICE.

AUGUST KNISTROM, OF BINGHAMTON, NEW YORK.

CALCULATING-MACHINE.

1,072,740.

Specification of Letters Patent.  Patented Sept. 9, 1913.

Application filed December 17, 1910. Serial No. 597,739.

*To all whom it may concern:*

Be it known that I, AUGUST KNISTROM, a subject of the King of Sweden, residing at Binghamton, in the county of Broome and State of New York, have invented certain new and useful Improvements in Calculating-Machines, of which the following is a full, clear, and exact description.

In certain types of calculating machines the items are set up by manipulation of suitable keys, and the mechanism which effects the calculations is actuated by a manual operating lever. For convenience and rapidity of operation it is customary to give the lever a limited movement, say through an angle of about 30° or 40°; but it is nevertheless desirable that the main operating shaft, which is actuated by the operating lever and which transmits motion to the calculating instrumentalities, make a complete rotation, or at least turn through a greater angle than does the said lever. It is also desirable that this movement of the shaft be substantially uniform, and that there shall be no possibility of injury or breakage by too vigorous use of the device in the hands of a careless or inexperienced operator.

My present invention has for its chief object to provide improved transmission mechanism of the kind referred to, which shall be efficient and reliable in operation.

A further object is to provide in connection with such mechanism means for transmitting to the calculating machine the power of a suitable motor when the machine is to be power-driven instead of being operated by hand.

To these and other ends the invention consists in the novel features of construction, arrangements of parts, and combinations of elements hereinafter described and more particularly set forth in the claims.

While the invention is capable of various embodiments, I have selected for specific illustration and description herein only the preferred construction, which exhibits the invention in convenient and effective form.

Referring now to the annexed drawings, in which the aforesaid preferred embodiment of the invention is illustrated, Figure 1 is a side view of the machine, with a portion of the casing broken away to show the interior parts. Fig. 2 is a sectional plan view. Fig. 3 is a section on line 3—3 of Fig. 2. Fig. 4 is a longitudinal section on line 4—4 of Fig. 2. Fig. 5 is a detail view of the means for disconnecting the manual operating lever when the machine is to be driven by a motor. Fig. 6 shows the same parts as are illustrated in Fig. 5, but viewed from the opposite side thereof. Fig. 7 is a detail view of the mechanism for transmitting motion from the power shaft, that is, the shaft to which the power is applied either by the hand or from a suitable motor, to the main operating shaft. In this figure the parts are shown in their initial positions, before the cycle of movement begins. Figs. 8, 9 and 10 show the same parts as are illustrated in Fig. 7, but at different stages of the cycle. Fig. 11 is an end view of Fig. 7. Fig. 12 is an end view of Fig. 8, but with the cam-actuating pawls removed. Fig. 13 is a detail section view on line XIII—XIII of Fig. 9, showing the construction of the pivotal connection between the actuating arm (33), and the connecting rod (36) and links (47, 48), by which motion is transmitted from the power shaft to the main operating shaft. Fig. 14 is a detail view from the rear of Fig. 10, showing the cam-actuating pawls and the cam with which they coöperate.

The power shaft of the machine, that is, the shaft to which the power, whether from the hand or from a suitable motor, is first communicated is designated by 1. Pinned to this shaft is a hub or sleeve 2 carrying at its inner end a disk 3. Loose on the hub is a ring or sleeve 4, (Fig. 3), and fast to the latter is a disk 5, adjacent to the first-mentioned disk 3. Pivoted to an arm 6 on disk 5 is a pawl 7, normally engaging a notch in the disk 3, and held in such engagement by a spring 8 connected to an arm 9 on the opposite side of disk 5. The hub 10 of the manual operating lever 11 fits over the end of the shaft 1, and is provided with projections or lugs entering notches 12 in the ring 4. Remembering now that the sleeve or hub 2 is pinned to the shaft and that the disk 5 and hub 4 are locked to the hub 2 by the pawl 7, it will be seen that the movement of ring 4, produced by actuation of the operating lever, will be communicated to the shaft; in fact the lever and shaft will move as though they were integral with each other, the connecting devices just described being provided to permit actuation of the shaft at will by a motor instead of by hand, as will be fully explained hereinafter.

On an adjacent part of the shaft and pinned thereto is a sleeve 13, on which is fixed a disk 14, having an arm 14ª, and a disk 15 having diametrically arranged arms 16, 17, the last named arm being alongside of arm 14ª and securely connected thereto by a stud 18, to give the parts the desired strength and rigidity. Pivoted to the arm 16 is a link 19, connected at its rear end to coil springs 20, which are in turn connected to an arm 21 mounted on a rear auxiliary shaft 22 and in rigid connection with an arm 23 extending in the opposite direction. Reaching forwardly from the latter arm, 23, is a long link 24 pivoted to an arm 25 on a hub 26, which is rotatably mounted on the shaft 1 by the roller bearings 27. It will therefore be seen that when the operating lever 11 is thrown forward, the hub or sleeve 13 and arm 16, turning with the power shaft 1 as before described, will draw link 19 and springs 20 forward, thereby retracting arm 23 and link 24, and that the latter will turn arm 25 and hub 26 on the shaft 1. The hub 26 is itself secured fixedly by a set screw 28 to a sleeve 29 loose on the shaft and rotatably mounted in roller bearings 30 in the side frame 31. Fast to sleeve 29 is a disk 32 having an upwardly extending arm 33, so that as the operating lever is drawn forward the arm 33 will move in the same direction.

On the arm 33 is a crank pin 34, engaging a longitudinal slot 35 in the adjacent forward end of a connecting rod or link 36 which extends rearwardly and has its rear end pivoted to a crank pin 37 on a crank disk 38. The latter is fixed on a transverse shaft 39, the main operating shaft of the machine. When the arm 33 is in its normal or initial position, as shown in Fig. 7, the crank pin 37 is on the rearward dead center. For the purpose of throwing the parts off the dead center, and for actuating the crank-disk through certain portions of its movement, the following devices are provided.

Riveted on the crank-disk is a cam 40, and loose on the shaft alongside of the cam are two arms or dogs 41, 42, carrying pivoted pawls 43, 44, respectively, provided with roller studs 45, 46, bearing on the cam. Pivoted to the ends of the dogs are two links 47, 48, reaching forward into pivotal connection with the crank-pin 34 on arm 33.

It will now be clear that as the arm 33 turns, in the direction of the arrow in Fig. 7, the crank pin 34 will first move idly in slot 35, but during this movement the links 47, 48 turn the dogs in opposite directions on shaft 39. The dog 41 carries its pawl 43 idly over the cam, but the other pawl, bearing against the shoulder of the cam, rotates the latter clockwise (as viewed in Fig. 7) and with it the crank-disk 38 and shaft 39. Moreover, it will be seen that since the push of the pawl 44 is exerted substantially at right angles to the line joining the centers of shafts 1 and 39 the power of the former shaft is applied more efficiently than if it were applied through the connecting rod 36. As the cam and crank disk rotate, however, pin 37 is of course carried downward off the dead center, and the forward component of its motion increases, finally equaling the similar component in the motion of stud 46. At this point the former component is still increasing, while the latter is decreasing; hence the connecting rod 36 will now take up the actuation of the disk and the pawl 44 will fall behind. By this time, however, the crank pin 37 has reached the point at right angles to the line between shafts 1 and 39, and hence is applying the power more efficiently than would be the case if pawl 44 continued to act, since the latter's angle of torque is now considerably less than a right angle.

As the connecting rod 36 continues to act the cam shoulder advances farther and farther from the pawl stud 46, as appears in Fig. 8, and at the same time pawl 43 is approaching it with an increasing component of forward motion. Fixed on the shaft 39 is a two-bladed cam 39ª, (Fig. 4), on which bears a roller 39ᵇ on the end of a bell crank lever 39ᶜ, held against the cam by a strong spring 39ᵈ. As the arm 33 and connecting rod 36 continue their forward movement the cam 39ª raises lever 39ᶜ against the tension of its spring, and the inclined face 39ᵉ of the cam approaches the roller 39ᵇ. Finally, as the connecting rod approaches the forward dead center the roller 39ᵇ drops into engagement with the inclined surface of its cam and by the action of spring 39ᵈ gives a strong impulse in the clockwise direction (as viewed in Fig. 4), and, aided by the momentum of the machine, carries the cam 40 and crank-disk 38 past the dead center. When the crank-pin 37 is just about at the dead center the shoulder of cam 40 overtakes the pawl 43, and stud 45 immediately drops into engagement with the shoulder, as shown in Fig. 9. The operating lever now begins its return movement, and with it the arm 33; but the crank-pin 34 being now at the forward end of the slot 35, the connecting rod 36 does not immediately begin its rearward movement. However, pawl 43, now moving to the rear, is in engagement with the cam shoulder at a torque angle of substantially ninety degrees, and continues the rotation of the cam, but the crank-pin 37 soon reaches a point where its increasing rearward component of motion equals the decreasing rearward component of stud 45 and thereupon takes up the work, in the manner described in connection with pawl 42. As the crank-pin 37 continues its rearward movement the cam shoulder gains on the pawl, as shown in Figs. 10 and 14, but at the same time the second inclined edge, 39$^f$, of the cam 39$^a$, is approaching the roller 39$^b$; and as the connecting rod approaches the rearward dead center the cam 39$^a$, in the manner previously described, acts to carry the cam 40 and crank-disk 38 to the initial position, shown in Fig. 7; pawl 42 at that time meeting the shoulder or cam 40 and dropping into engagement therewith. A cycle of movement is thus completed, leaving the parts in the positions illustrated in Fig. 7.

The return movement of the operating lever 11 can be effected by hand, but I prefer to employ a spring. For this purpose the shaft 1 is provided with a rigidly mounted arm 49, (Fig. 2), connected by a link 50 to the expansible coil spring 51, the rear end of which is fast to a fixed stud or pin 52.

As previously stated, it is desirable at times to operate the machine by a motor instead of by hand. For this purpose I prefer to have the motor run continuously, and connect it at will to the machine by means of suitable clutch mechanism, such, for example, as is described in my copending application, Ser. No. 437,866, filed June 11, 1908. The clutch mechanism therein described is idle during the setting up of an item, but is thrown into action by the operator by the depression of a key (shown in the present drawings at 53, Fig. 1) and is automatically thrown out of action at the completion of one rotation of the main operating shaft 39. For the purpose of connecting such clutch mechanism with the power shaft 1, a link 54 (Figs. 1 and 4) is provided, pivotally connected to a forward extension or arm 55 of the disk 15, so that as the link is drawn down by the motor, operating through the clutch mechanism, it will rotate the disk 15 and advance the link 19, which, it will be remembered, is the element by which the movement of the operating lever is transmitted to shaft 22. The operating lever 11, as stated above, is connected with the ring 4 by means of projections on the former entering notches 12 in the latter. Said lever would move, when the machine is motor-operated, forward and backward if provisions were not made to disengage the same from operative connection with the main shaft 1. Thus when the operator desires to use the motor, he first throws the lever farther to the rear, past its normal position, to its inoperative position. This movement of the lever causes a pin 56 on pawl 7 (see Figs. 5 and 6) to engage a cam-stop 57, which promptly draws the pawl out of engagement with the notch in disk 3. Remembering now that it is through the pawl 7 and disk 3 that the lever transmits its power to the shaft 1, it will be seen that the action of the cam-stop disconnects the lever from the shaft and allows the hub 10, to which the lever is connected, and the ring 4 together with its disk 5 to have a free and loose connection upon the power shaft 1 whereby the same will remain stationary during the time that the same is connected to the motor. On desiring to use the lever again, the operator simply draws it forward, whereupon the pawl 7, disengaged from the cam-stop, snaps back into its notch in disk 3.

The means of connecting the arm 54 with the clutch shaft is shown in Fig. 4 comprising a slot 54$^a$ in the said arm and a pin $c$ of the crank arm C coöperating with said slot.

What I claim is:

1. In an adding machine, in combination, of driving mechanism comprising a power shaft, an operating shaft, and means connecting the power shaft with the operating shaft, said means adapted to rotate the operating shaft by an oscillation of the power shaft.

2. In a calculating machine, the combination of a power shaft, an auxiliary shaft operated by said power shaft, means for oscillating said auxiliary shaft, an operating shaft, and means operated by the oscillation of the auxiliary shaft to impart rotary motion to the operating shaft.

3. In a machine of the character described, the combination of a power shaft, an auxiliary shaft operated by said power shaft, a third or driven shaft, and means connecting the power shaft auxiliary shaft and driven shaft to operate the latter, said connecting means adapted to rotate said third mentioned shaft upon imparting an oscillatory motion to the first mentioned shaft.

4. In a machine of the class described, a power shaft, means for manually or automatically operating the power shaft, an auxiliary shaft; means connecting said power shaft to the said auxiliary shaft to operate the latter, a driven shaft and means extending from the auxiliary shaft back to the power shaft for operating the said driven shaft.

5. In a machine of the class described, a power shaft, a sleeve pinned to said power shaft said sleeve having a disk thereon, a ring having a disk, carried by said sleeve, an arm mounted on said disk, an auxiliary shaft, and means carried by said arm for operating the auxiliary shaft.

6. In a machine of the class described, in combination, a power shaft, a sleeve pinned to said power shaft, said sleeve having a disk thereon, a ring, having a disk mounted upon said sleeve, an arm mounted on said second mentioned disk, a pawl connected to said arm and adapted to engage a notch in the first mentioned disk and means for rotating the ring.

7. In a machine of the class described, in combination, a shaft, a sleeve pinned to said shaft said sleeve having a disk thereon, a ring provided with a disk and mounted upon said sleeve, an arm mounted on said second mentioned disk, a pawl carried by said arm of the last mentioned disk adapted to engage a notch in the first mentioned disk, resilient means for maintaining the pawl in engagement with the notch, and means for rotating the ring.

8. In a machine of the class described, in combination, a shaft, a sleeve mounted on said shaft, said sleeve having a disk thereon, a ring mounted on said sleeve, said ring being provided with a disk adjacent the first mentioned disk, an arm mounted on said second mentioned disk, a pawl mounted on said arm and adapted to engage a notch in the first mentioned disk, means for maintaining the pawl in engagement with the notch, and means for operating the ring whereby the shaft is rotated.

9. In a machine of the class described, in combination, a shaft, a sleeve mounted on said shaft, said sleeve having a disk mounted thereon, a ring mounted on said sleeve, said ring being provided with a disk adjacent the first mentioned disk, an arm mounted on said second mentioned disk, a pawl mounted on said arm and adapted to engage a notch in the first mentioned disk, a hub loosely mounted upon the shaft and having connection with the ring, and means for rotating said hub.

10. In a machine of the class described, in combination, a power shaft, a sleeve rigidly mounted on said power shaft, a ring adjacent to said sleeve, said ring and sleeve having each a disk mounted thereon also adjacent to each other, a pawl carried by the ring disk adapted to engage a notch in the sleeve disk, a hub on said shaft having operative connection with the ring, and means connected to the hub for operating the latter.

11. In a machine of the class described in combination, a power shaft, a sleeve rigidly mounted on said power shaft, a ring adjacent to said sleeve, said ring and sleeve having each a disk mounted thereon also adjacent to each other, a pawl carried by the ring disk adapted to engage a notch in the sleeve disk, a hub on said shaft, lugs on the end of said hub adjacent the ring said lugs adapted to engage with corresponding notches in the ring, and means for rotating the hub.

12. In a machine of the class described, in combination, a power shaft, a sleeve rigidly mounted on said power shaft, a ring mounted upon said sleeve, means for making an operative connection between the said sleeve and ring, a hub mounted upon said shaft and having lugs adapted to engage slots in the ring, and a handle for operating said hub whereby the power shaft is rotated.

13. In a machine of the class described, in combination, a shaft, a sleeve rigidly mounted on said shaft said sleeve having a disk thereon, a ring provided with a disk and mounted upon said sleeve, arms substantially diametrically opposed to each other on said second mentioned disk, a pawl one end of which is attached to one of said arms and adapted to engage a notch in the first mentioned disk, and the other end of said pawl adapted to be connected by a spring fastened to the second arm whereby the pawl is held in engagement with the notch.

14. In a machine of the class described, in combination, a power shaft, a sleeve fixedly secured to said power shaft, a ring rotatably mounted upon said sleeve a disk carried by said sleeve, a disk carried by said ring, arms carried by the disk of said ring, a pawl, one of said arms carrying the said pawl the other of said arms carrying a spring adapted to be connected to said pawl and said pawl adapted to be held by said spring in a notch on the ring disk, said ring having notches or slits in one end thereof, a hub loosely mounted on the power shaft adjacent to said ring and having lugs adapted to enter the notches or slits of said ring and an operating handle connected to said hub and adapted to operate the hub, the ring, the sleeve and in turn the shaft.

15. In combination with an adding machine, a power shaft mounted thereon, means manually operated to rotate said shaft, and means for automatically operating said power shaft, said manual means adapted to be thrown into inoperative position without being removed from said shaft.

16. In combination with an adding machine, a power shaft mounted thereon, oscillating means on said shaft for manually operating the latter, and means independent of the aforesaid means and also mounted on said shaft for the automatic operation of said shaft, said manual means adapted to be thrown into inoperative position by moving the same beyond one extremity of its oscillation.

17. In combination with an adding machine, a power shaft mounted thereon, means on said shaft for manually operating the latter, means also thereon independent of the aforesaid means for automatically operating the said shaft, and means in connection with the first mentioned means for throwing the latter into inoperative position.

18. In a device of the character described, a power shaft, automatic means for operating said power shaft comprising a sleeve rigidly mounted upon said shaft, a disk rigidly mounted upon the sleeve, an arm on said disk and a link connected to said arm at one end and adapted to be connected to a continuously driven motor at the other end.

19. In a device of the character described, a power shaft, automatic means for operating said power shaft comprising a sleeve rigidly mounted upon said shaft, a disk rigidly mounted upon the sleeve, an arm on said disk, a link connected to said arm at one end and adapted to be connected to a continuously driven motor at the other end, in combination with means adjacent and mounted upon the power shaft for manually operating the said power shaft.

20. In a device of the character described, in combination, a shaft, automatic means thereon for operating the said shaft comprising a sleeve rigidly mounted thereon a disk mounted on the sleeve, a second disk connected to the first mentioned disk, an arm on one of the disks, a link connected at one end to said arm and its other end adapted to be connected with a continuously driven motor, in combination with means mounted on said power shaft to operate a second shaft.

21. In combination with an adding machine, a power shaft, automatic means for oscillating said shaft, an operating shaft, means for operating said shaft manually and independently of said first named means, and means associated with the automatic and manual means for rotating the operating shaft.

22. In combination with an adding machine, a power shaft, automatic means for oscillating said shaft in one direction, manual means independent of and adjacent to the first mentioned means for operating said shaft in the same direction, means independent of the above means for restoring the parts to normal position, an operating shaft, and means for operatively connecting the power shaft and the operating shaft, said means translating the oscillatory movement of the power shaft to rotary movement in the operating shaft.

23. In combination with an adding machine, a frame therefor, a sleeve mounted in said frame, a shaft adapted to oscillate in said sleeve, manual means operatively connected to said sleeve to oscillate said shaft, and means also associated therewith for automatically oscillating said shaft.

24. In combination with an adding machine, a frame, a sleeve mounted in said frame, a shaft rotatably mounted in said sleeve, a hub fixedly secured to said sleeve, a second sleeve rigidly connected to said shaft, and a disk mounted on said second sleeve said disk abutting the adjacent end of the hub.

25. In combination with an adding machine, a frame a sleeve mounted in said frame, a shaft rotatably mounted in said sleeve, a hub fixedly secured to said sleeve, a second sleeve on said shaft and rigidly secured thereto, a disk fixed to said second sleeve, a second disk mounted on said second sleeve and rigidly attached to the first mentioned disk, the last mentioned disk abutting the adjacent end of the hub and adapted to rotate in an opposite direction from the hub.

26. In combination with an adding machine, a shaft, a sleeve mounted on said shaft, a shoulder on one end of said sleeve, a hub on the other, a frame supporting said sleeve and shaft and having a ball bearing connection with the sleeve between the shoulder and the hub.

27. In combination with an adding machine, a power shaft, a sleeve mounted on said shaft, a shoulder on one end of said sleeve, a hub on the other projecting beyond the sleeve, a frame for supporting said sleeve and having a ball-bearing connection with the latter between the sleeve and the hub, a second sleeve mounted on said shaft, a disk rigidly connected to the second sleeve and abutting the adjacent end of the hub, said hub having a ball-bearing connection with the power shaft between the first mentioned sleeve and the disk and second mentioned sleeve.

28. In combination with an adding machine, a power shaft, a sleeve rotatably mounted on said shaft a hub on one end of said sleeve and projecting beyond the sleeve, a second sleeve detachably mounted on said power shaft, a disk rigidly connected to the second sleeve and abutting the adjacent end of the hub, and a ball-bearing connection between the hub and shaft located between the sleeves.

29. In a device of the character described, in combination, a power shaft, a sleeve detachably mounted near one end thereof, a second sleeve rotatably mounted upon said shaft and abutting the first mentioned sleeve, a hub on the end of said second sleeve remote from the first mentioned sleeve and adapted to project from said second sleeve, and a third sleeve rigidly mounted upon said shaft and having means thereon adapted to abut the projecting end of the hub.

30. In a device of the character described, in combination, a power shaft, a sleeve detachably mounted near one end thereof, means connected thereto for driving the power shaft, a second sleeve loosely mounted on said shaft and abutting the first mentioned sleeve, a hub on said second mentioned sleeve and projecting from the end thereof which is remote from the first mentioned sleeve, a third sleeve mounted upon said shaft, means thereon abutting the projecting end of the hub, and means on said third sleeve adapted to operate said shaft independently of the aforesaid means on the first mentioned sleeve.

31. In a device of the character described, in combination, a power shaft, a sleeve detachably mounted thereon near one end thereof, a second sleeve loosely mounted on said shaft and abutting the first mentioned sleeve, a third sleeve mounted on said shaft, means on said third sleeve adapted to abut means on the second named sleeve, and means connected with the third sleeve for operating the power shaft.

32. In a device of the character described, in combination, a power shaft, a sleeve detachably connected thereto near one end thereof, a second sleeve loosely mounted on said shaft and abutting the first mentioned sleeve, a third sleeve mounted on said shaft, means on said third sleeve for operating the shaft, an auxiliary shaft and means also on the third sleeve for operating the auxiliary shaft.

33. In combination with an adding machine, a power shaft, a sleeve rigidly mounted thereon, another sleeve rigidly mounted on said shaft, and a sleeve loosely mounted on said shaft between the first two mentioned sleeves, means on the second mentioned sleeve for oscillating the shaft, an auxiliary shaft, means also on the second mentioned sleeve for oscillating the auxiliary shaft, and means connecting the auxiliary shaft to the third mentioned sleeve for rotating it in a direction opposite to that of the first mentioned sleeves.

34. In combination with an adding machine, a power shaft, a sleeve rigidly mounted thereon, a second sleeve loosely mounted on said shaft adjacent to the first mentioned sleeve, means connected to the first mentioned sleeve for oscillating the power shaft, an auxiliary shaft, means connecting the power shaft with the auxiliary shaft adapted to operate the latter, and means connecting the auxiliary shaft to the second mentioned sleeve for rotating it in a direction opposite to that of the first mentioned sleeve.

35. In combination with an adding machine, a power shaft, a sleeve rigidly mounted thereon, a second sleeve loosely mounted on said shaft adjacent to the first mentioned sleeve means connected to the first mentioned sleeve adapted to automatically operate the power shaft, means also on said first mentioned sleeve for operating a second shaft, and means connecting the second shaft with the second mentioned sleeve for oscillating the latter in a direction opposite to the first mentioned sleeve.

36. In combination with an adding machine, a power shaft, a sleeve rigidly mounted thereon, a second sleeve loosely mounted on said shaft adjacent to the first mentioned sleeve, means connected to the first mentioned sleeve to automatically operate the power shaft, means also on said first mentioned sleeve for operating a second shaft, means connecting the second shaft with the second mentioned sleeve for oscillating the latter and means also on said power shaft for manually operating the power shaft, the auxiliary shaft and the second mentioned sleeve.

37. In combination with an adding machine, a power shaft, a sleeve rigidly mounted thereon, a second sleeve loosely mounted on said shaft adjacent to the first mentioned sleeve, means connected to the first mentioned sleeve to automatically operate the power shaft, means also on said first mentioned sleeve for operating a second shaft, means connecting said second shaft with the second mentioned sleeve adapted to operate the latter, a third sleeve rigid on said power shaft, means connected thereto for manually operating the power shaft, auxiliary shaft and the second mentioned sleeve.

38. In combination with an adding machine, an oscillating power shaft, an auxiliary shaft oscillated by the power shaft, means between the two for connecting the same, an operating shaft, and means associated with the first two mentioned shafts for rotating said operating shaft.

39. In combination with an adding machine, a power shaft, means for oscillating said power shaft an auxiliary shaft oscillated by said power shaft, resilient means between the two for connecting the same, an operating shaft, and means connecting the auxiliary shaft with the power shaft and the latter with the operating shaft for rotating the said operating shaft.

40. In combination with an adding machine, a power shaft, a sleeve rigidly mounted thereon, an auxiliary shaft, oppositely extending arms mounted on said auxiliary shaft, means connected to the sleeve of the power shaft and to one arm of the auxiliary shaft, a second sleeve loosely mounted on said power shaft, and means connecting the second mentioned sleeve with the other arm of the auxiliary shaft whereby when the power shaft is rotated the loosely mounted sleeve will also be positively rotated.

41. In combination with an adding machine, a power shaft, a sleeve rigidly mounted thereon, an auxiliary shaft, oppositely extending arms mounted on said auxiliary shaft, resilient means connecting the sleeve of the power shaft with one arm of the auxiliary shaft, a second sleeve loosely mounted on said power shaft, and means connecting the second mentioned sleeve with the other arm of the auxiliary shaft.

42. In combination with an adding machine, a power shaft, an auxiliary shaft and an operating shaft; mechanism associated therewith for oscillating two of said shafts, and means for connecting the last mentioned shafts to the operating shaft, said means converting the oscillatory motion of the first two mentioned shafts into rotary motion of the operating shaft.

43. In combination with an adding machine, a power shaft, an auxiliary shaft and an operating shaft; means connecting the power shaft to the auxiliary shaft and to the operating shaft, the said means adapted to oscillate the one shaft and to rotate the other.

44. In combination with an adding machine, a power shaft, an auxiliary shaft, and an operating shaft; means for oscillating the power shaft, means connected to the power shaft adapted to oscillate the auxiliary shaft and to rotate the operating shaft.

45. In combination with an adding machine, a power shaft, an auxiliary shaft, and an operating shaft; means for oscillating the power shaft, resilient means connecting the power shaft with the auxiliary shaft and adapted to oscillate the latter and means on the power shaft adapted to rotate the operating shaft.

46. In combination with an adding machine, a power shaft, an auxiliary shaft, and an operating shaft; means for oscillating the power shaft, resilient means connecting the power shaft with the auxiliary shaft and adapted to oscillate the latter means connecting the power shaft with the operating shaft and adapted to rotate the latter, and means between the auxiliary shaft and the power shaft for operating the last mentioned means.

47. In combination with an adding machine, a power shaft, an operating shaft, means associated with said power shaft for oscillating the same, and means connecting the power shaft with the operating shaft and adapted to rotate the latter.

48. In combination with an adding machine, a power shaft, a sleeve mounted on said power shaft, means for oscillating the sleeve, an operating shaft, and means connecting the sleeve to the operating shaft and adapted to rotate the latter.

49. In combination with an adding machine, a power shaft, a sleeve mounted on said power shaft, an arm connected to said sleeve, means associated with the power shaft for oscillating the sleeve and arm, an operating shaft and means connected to the arm of said sleeve and to the operating shaft for rotating the latter.

50. In a device of the character described, in combination, a power shaft, an operating shaft, means for oscillating the power shaft, means for turning the oscillatory movement of the power shaft into rotary movement of the operating shaft comprising a disk fixedly mounted on said operating shaft, a connecting rod between the power shaft and the said disk, a cam riveted to said disk and dogs adjacent thereto, pawls pivoted to said dogs, recesses in the cams for said pawls, rods connecting said dogs to the power shaft, the construction being such that when the power shaft is oscillated the rods connecting the disk and dogs will each give the disk certain amount of rotation.

51. In a device of the character described, a shaft, means associated therewith for oscillating the same, a second shaft, means for converting the oscillatory movement of the first mentioned shaft into rotary motion of the second mentioned shaft comprising in combination, a disk on said second mentioned shaft, a connecting means between the first mentioned shaft and the disk for partially rotating the disk, means for taking up work of the aforesaid means to advance the disk and means for finishing the cycle.

52. In combination with an adding machine, a power shaft, means associated therewith for oscillating the same, an operating shaft, means for converting the oscillatory movement of the power shaft into rotary movement on the operating shaft comprising an arm on the power shaft, a disk on the operating shaft, a cam on said disk, dogs adjacent thereto, a connecting rod from the arm of the power shaft to the opposite side of the disk of the operating arm having a lost motion connection with said arm, links from the said arm connecting the dogs on opposite sides of the cam, pawls on said dogs adapted to engage shoulder on said cam at different times in the cycle of operation.

53. In combination with an adding machine, a power shaft, means associated therewith for oscillating the same, an operating shaft, a disk thereon, means for partially rotating said disk, means for taking up the rotation of the disk and continuing the same, and means assisting in the completion of the cycle.

54. In combination with an adding machine, a power shaft, means associated therewith for oscillating the same, an operating shaft, a disk thereon, means connected with the power shaft for giving the disk a partial rotation, means independent of the aforesaid means for taking up the cycle of operation and continuing the same, and a third means for completing the cycle.

55. In combination with an adding machine, a power shaft, means associated therewith for oscillating the same, an operating shaft, means for transmitting a rotary motion to the operating shaft from the oscillatory motion of the power shaft comprising a disk fixedly secured to said operating shaft, connecting means between the power shaft and the disk including a connecting rod and links independent of said connecting rod and each adapted to partially rotate the disk to complete the cycle.

In testimony whereof I affix my signature in the presence of two subscribing witnesses.

AUGUST KNISTROM.

Witnesses:
L. F. GIBLIN,
M. M. BOLAND.